(12) United States Patent
LaBerge (10) Patent No.: US 6,615,345 B1
(45) Date of Patent: Sep. 2, 2003

(54) SYSTEM AND METHOD FOR REGULATING DATA CAPTURE IN RESPONSE TO DATA STROBE USING PREAMBLE, POSTAMBLE AND STROBE SIGNATURE

(75) Inventor: Paul A. LaBerge, Shoreview, MN (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/363,594

(22) Filed: Jul. 29, 1999

(51) Int. Cl.[7] ............................................. G06F 1/04
(52) U.S. Cl. ..................... 713/100; 713/600; 714/718; 365/189; 365/193; 365/201; 365/233; 711/105; 711/167
(58) Field of Search ................................. 713/100, 600; 714/718; 365/189, 193, 201, 233; 711/105, 167

(56) References Cited

U.S. PATENT DOCUMENTS

| | | | | |
|---|---|---|---|---|
| 4,812,769 A | * | 3/1989 | Agoston | 327/261 |
| 5,572,669 A | * | 11/1996 | Sabapathi et al. | 714/45 |
| 5,862,150 A | * | 1/1999 | Lavelle et al. | 714/732 |
| 5,948,083 A | * | 9/1999 | Gervasi | 710/62 |
| 5,978,281 A | * | 11/1999 | Anand et al. | 365/189.05 |
| 6,029,250 A | * | 2/2000 | Keeth | 713/400 |
| 6,041,419 A | * | 3/2000 | Huang et al. | 713/401 |
| 6,101,612 A | * | 8/2000 | Jeddeloh | 713/401 |
| 6,108,795 A | * | 8/2000 | Jeddeloh | 713/401 |
| 6,215,710 B1 | * | 4/2001 | Han et al. | 365/193 |
| 6,292,521 B1 | * | 9/2001 | Lai et al. | 375/357 |
| 6,401,213 B1 | * | 6/2002 | Jeddeloh | 713/401 |

FOREIGN PATENT DOCUMENTS

| | | | | |
|---|---|---|---|---|
| KR | | 296919 B | * 7/2001 | G11C/11/401 |

OTHER PUBLICATIONS

IBM TDB, vol. 29, issue 5, pp. Nos. 2076–2079, Sub: "Logic interface to allow high speed performance event tracing with low performance monitoring device" date:Oct. 1, 1996.*

* cited by examiner

Primary Examiner—Thomas Lee
Assistant Examiner—Nitin C. Patel
(74) Attorney, Agent, or Firm—Trop, Pruner & Hu, P.C.

(57) ABSTRACT

A computer system includes a memory bus, a memory device and a bridge. The memory device is adapted to furnish a data strobe signal to the memory bus and furnish other signals (to the memory bus) that are indicative of data. The bridge includes a first circuit that is adapted to use the other signals to capture the data in response to the data strobe signal. A second circuit of the bridge is coupled to the first circuit and is adapted to receive a data strobe signal from a memory bus. The data strobe signal is furnished by the memory device and includes a postamble. The second circuit is also adapted to monitor the data strobe signal to detect a signature of the data strobe signal that precedes the beginning of the postamble and prevent the first circuit from responding to the data strobe signal after detection of the signature.

34 Claims, 6 Drawing Sheets

SYSTEM AND METHOD FOR REGULATING DATA CAPTURE IN RESPONSE TO DATA STROBE USING PREAMBLE, POSTAMBLE AND STROBE SIGNATURE

BACKGROUND

The invention generally relates to a circuit for regulating a response to a data strobe signal.

Figure 1:
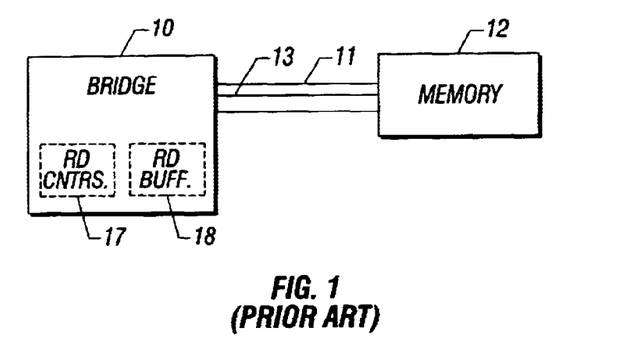
FIG. 1 is a schematic diagram of a memory controller and memory according to the prior art.

Referring to FIG. 1, a typical computer system may include a bridge 10 to transfer data between busses of the computer system. For example, the bridge 10 may include a memory interface to control the storage and retrieval of data from a system memory 12. To accomplish this the bridge 10 typically initiates read and write operations over a memory bus 11 that is coupled to the system memory 12.

Figures 2, 3:
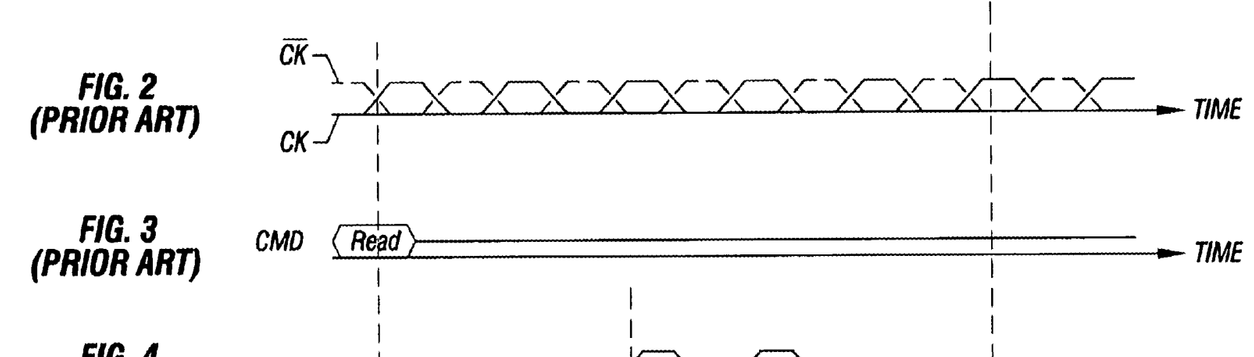
FIGS. 2, 3, 4, 5 and 6 are waveforms of signals that are associated with a memory bus of FIG. 1.
Figures 4, 5:
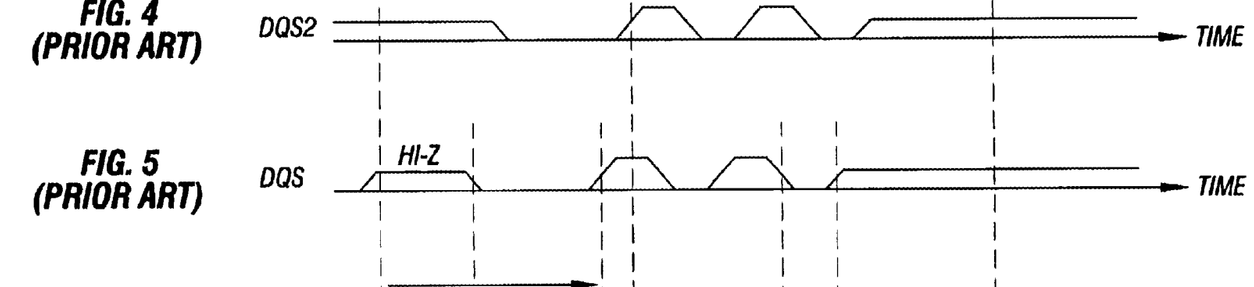
Figure 6:
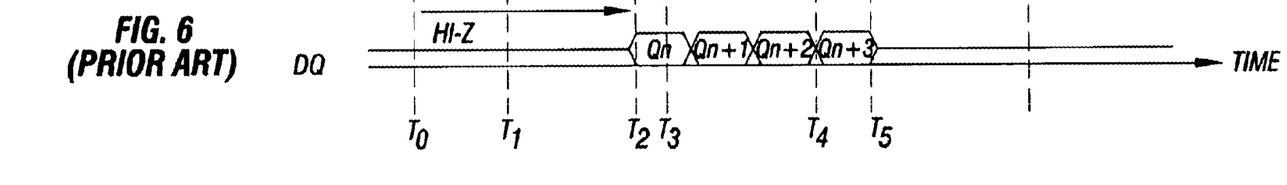

More particularly, a memory burst read operation is depicted in FIGS. 2, 3, 4, 5 and 6 for a scenario where the system memory 12 is formed from double data rate (DDR) synchronous dynamic random access memory (SDRAM) memory devices. In the burst read operation, a DDR memory device furnishes signals (one of the signals called DQ is depicted in FIG. 6) that indicate the data and a data strobe signal (called DQS and depicted in FIG. 5) to synchronize the capture of the data by the bridge 10. More specifically, the burst read operation may begin near time To when the bridge 10 furnishes signals (to the memory bus 11) that indicate a read command, as depicted in FIG. 3. In response to the read command, the memory device may begin furnishing the DQS signal to a data strobe line 13 at time $T_1$, by driving the DQS signal from a tri-stated level to a logic zero level. From times $T_2$ to $T_4$, the memory device drives the DQS signal in synchronization with a clock signal called CK (see FIG. 2) that is furnished by the memory bridge 10. During this time interval, on each positive and negative edge of the DQS signal, the memory device begins furnishing a different set of signals (to the data lines of the memory bus 11), each of which indicates a different set of data. Thus, for example, at time $T_2$, the memory device drives the signal DQ to indicate a bit (denoted by Qn in FIG. 6) for one cycle of the CK clock signal.

The bridge 10 may use the edges of the DQS signal to trigger the capture of each set of data from the memory bus. However, due to the distortion that is introduced by the memory bus 11, the rise and fall times of the data signals may produce a narrow window in which each data signal accurately indicates its bit of data. This narrow window typically is called a data eye and represents the time interval in which the bit of data (as indicated by the corresponding data signal) is valid. For example, for the bit of data that is represented by the notation Qn in FIG. 6, the data eye may occur around time $T_3$, a time approximately near the center of the window in which the DQ signal indicates the Qn bit of data. Because the bridge 10 may use the edges of the DQS signal to capture the data, the bridge 10 may shift the received DQS signal in time to produce a delayed data strobe signal (called DQS2 and depicted in FIG. 4) so that the strobe edges of the DQS2 signal are aligned with the data eyes. Therefore, as an example, the first positive edge of the DQS2 signal occurs at time $T_3$, a time that is approximately centered in the data eye where the DQ signal indicates the Qn bit, for example.

Due to the propagation delays, fall time and rises times that are introduced by the memory bus 11, the DQS signal may not arrive at the bridge 10 in synchronization with the CK signal. Therefore, for purposes of establishing a window of time for the bridge 10 to begin responding to the DQS signal (when driven by a memory device), the DQS signal includes a preamble that precedes the first positive edge of the DQS signal and indicates the beginning of the active strobe. For the DQS signal depicted in FIG. 5, the preamble begins at time $T_1$, and ends at time $T_2$. The DQS signal also has a postamble (from time $T_4$ to time $T_5$), a time interval that indicates the end of the active strobe and establishes a turn around time for the bridge 10 to stop responding to the DQS signal.

The preamble and postamble are included in the DQS signal to prevent the bridge 10 from responding to the edges of the DQS signal at the inappropriate time. For example, referring also to FIG. 1, if the bridge 10 responds to the DQS signal at the inappropriate time, the wrong edges of the DQS signal may increment read counters 17 (of the bridge 10) that are used to store data into read buffers 18. As a result, the current read operation or the next read operation may be corrupted. Unfortunately, the postamble (that has a duration of approximately one half of one period of the CK signal) may have a smaller duration than the preamble (that has a duration of approximately one period of the CK signal). As a result, there may be a higher likelihood that the bridge 10 may respond to the DQS signal beyond the postamble, an action that may corrupt one or more read operations.

Thus, there is a continuing need for an arrangement that addresses one or more of the above-stated problems.

SUMMARY

In one embodiment of the invention, a method for use with a computer system includes receiving a data strobe signal from a memory bus. The data strobe signal is furnished by a memory device and includes a postamble. The data strobe signal is monitored to detect a signature of the data strobe signal that precedes the beginning of the postamble. Data capture circuitry is prevented from responding to the data strobe signal after detection of the signature.

In another embodiment, a bridge for use with a computer system includes a first circuit and a second circuit. The first circuit is adapted to receive a data strobe signal from a memory bus and capture data from the bus in response to the data strobe signal. The second circuit is adapted to measure a delay and prevent the first circuit from responding to the data strobe signal until after the delay expires.

Advantages and other features of the invention will become apparent from the following description, drawing and claims.

DETAILED DESCRIPTION

Figure 7:
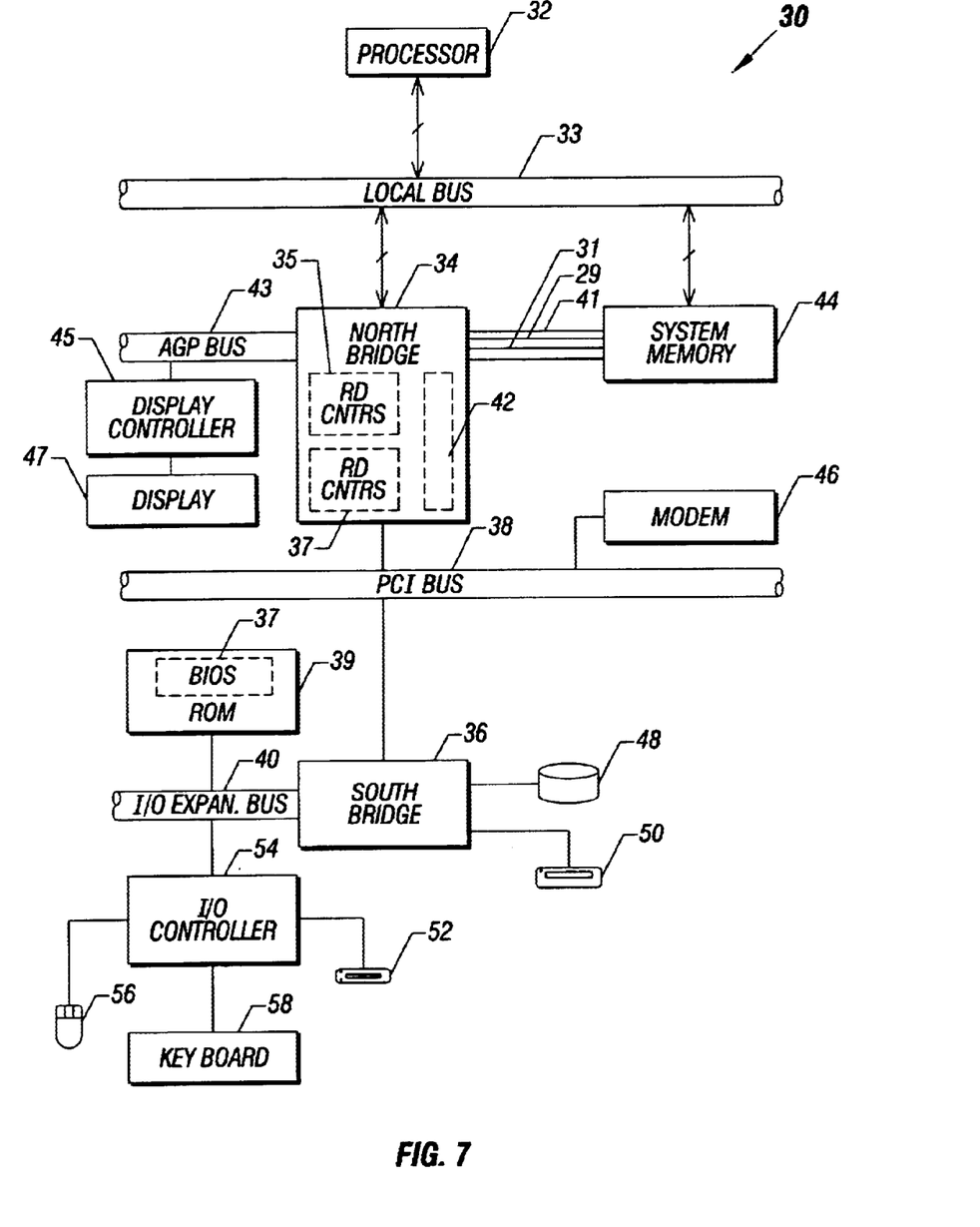
FIG. 7 is a schematic diagram of a computer system according to an embodiment of the invention.

Referring to FIG. 7, an embodiment 30 of a computer system in accordance with the invention includes a north bridge 34 that provides an interface to transfer data between buses of the computer system 30. For example, the north bridge 34 may provide an interface between a local bus 33 and a memory bus 41. Due to this interface, a processor 32 (a central processing unit (CPU), for example) may use the north bridge 34 to execute a read operation over the memory bus 41 to retrieve data from a system memory 44, a memory that may be formed from double data rate (DDR) synchronous dynamic random access memories (SDRAMs). More particularly, during the read operation, the system memory 44 may provide a data strobe signal (called DQS and depicted in FIG. 8) to a data strobe line 31 of the memory bus 41. The north bridge 34 uses the DQS signal to synchronize the capture read data from data lines 29 of the memory bus 41. For this to occur, the north bridge 34 may include read counters 35 that generally track the read operation by selectively enabling read buffers 37 to capture the data. The DQS signal has two positive and two negative strobe edges that may be used to trigger the capture of data from the memory bus 41.

Figure 10:
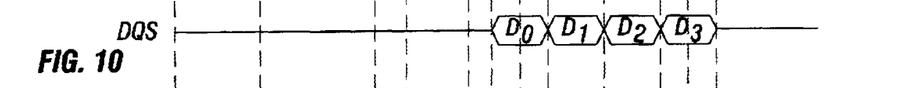

To ensure that data capture circuitry of the north bridge 34, such as the read counters 35, do not respond to incorrect edges of the DQS signal, the north bridge 34 may include a data strobe response circuit 42 that regulates when the data capture circuitry of the north bridge 34 responds to the DQS signal, as described below. More particularly, the data strobe response circuit 42 introduces a delay into the DQS signal to produce a signal called DQS_OUT (see FIG. 11) that is used to drive the read counters 35. Due to this delay, the strobe edges of the DQS_OUT signal align with the data eyes of data signals from the memory bus 41. For example, from times $T_4$ to $T_8$, a data signal (called DQ and depicted in FIG. 10) may have four data eyes (labeled $D_0$, $D_1$, $D_2$ and $D_3$) that each indicates a bit value for a different memory location. Because the strobe edges of the DQS_O signal are centered in the data eyes, these edges may be used to trigger the capture of the corresponding bits.

In addition to delaying the DQS signal to produce the DQS_OUT signal, the data strobe circuit 42 also regulates when the circuit 42 furnishes the DQS_OUT signal to the circuitry of the north bridge 34. In this manner, the data strobe response circuit 42 has circuitry (described below) to furnish the DQS_OUT signal during a time interval that begins during the preamble of the DQS_OUT signal and ends during the postamble of the DQS_OUT signal.

Figure 8:
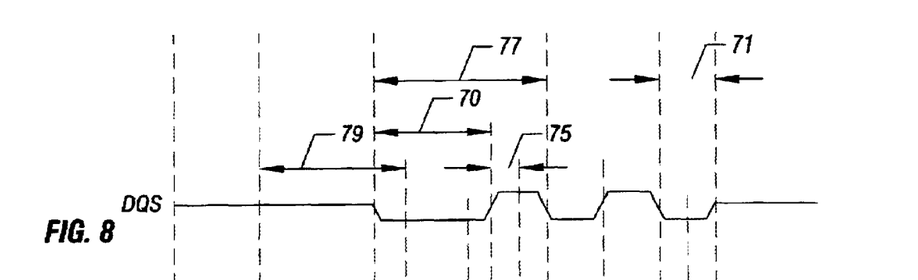
FIGS. 8, 9, 10, 11 and 12 are waveforms of signals of the computer system of FIG. 7 according to an embodiment of the invention.
Figure 11:
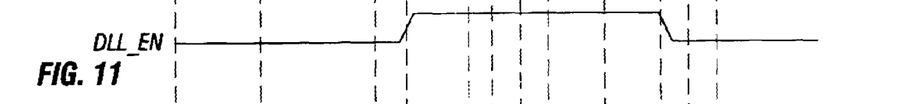
Figure 12:
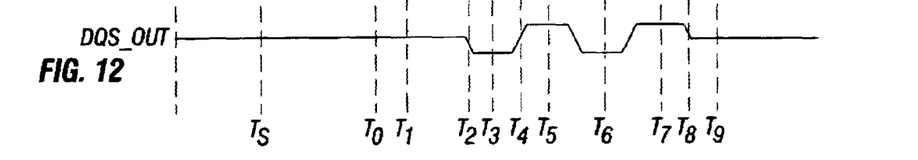
Figure 13:
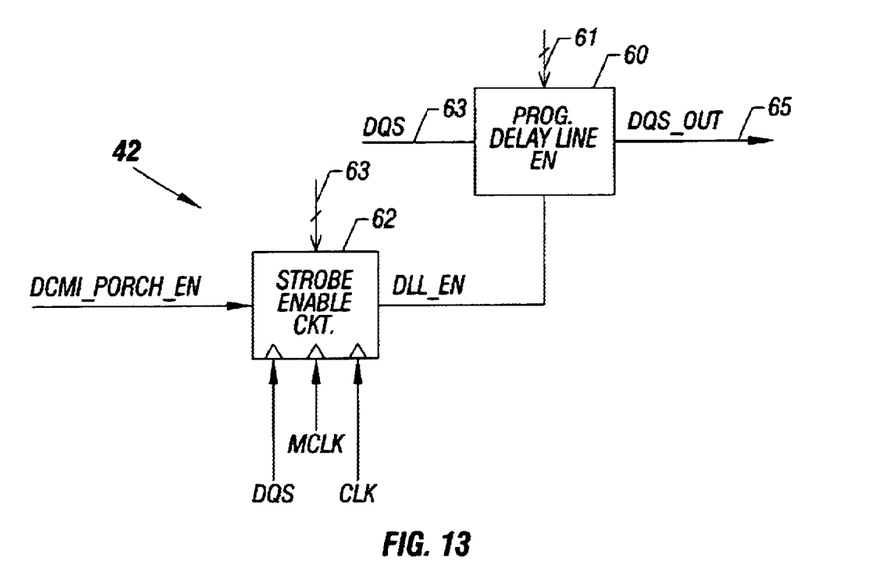
FIG. 13 is a schematic diagram of a circuit of a bridge of the computer system of FIG. 7 according to an embodiment of the invention.

Referring to FIGS. 8, 12 and 13, to accomplish this, the data strobe response circuit 42 includes a programmable delay line 60 (programmable via lines 61 that are coupled to registers of the north bridge 34) that receives the DQS signal at an input terminal 63 and introduces a delay 75 in the DQS signal to generate the DQS_OUT signal, a signal that drives an internal data strobe line 65. The delay 75 is used to align the data eyes of the DQ signal (see FIG. 10) with the corresponding negative and positive edges of the DQS_OUT signal. The data strobe response circuit 42 also includes a strobe enable circuit 62 that generates a signal called DLL_EN (see FIG. 11), a signal that selectively controls when the delay line 60 furnishes the DQS_OUT signal. In some embodiments, the delay line 60 does not immediately respond to a change in the logical state of the DLL_EN signal, but rather, the DLL_EN signal propagates internally through a delay path (in the delay line 60) that is approximately equivalent to the delay experienced by the DQS signal before appearing as the DQS_OUT signal. As a result, the delay line 60 has a delayed response to changes in the logic state of the DLL_EN signal.

For example, referring also to FIG. 11, the strobe enable circuit 62 may deassert (drive to a logic zero level, for example) the DLL_EN signal at time $T_7$ to disable the delay line 60 from providing the DQS_OUT signal. However, the delay line 60 continues to furnish the DQS_OUT signal until time $T_8$, a time at which the output terminal of the delay line 60 returns to a tri-stated level. Because, in some embodiments, the delay line 60 effectively responds to the DLL_EN and DQS signals in the same delayed manner, the strobe enable circuit 62 may base its generation of the DLL_EN signal on the timing of the DQS signal, as further described below.

As an example, due to the timing sequence of a memory read operation, the strobe enable circuit 62 may expect to observe the preamble of the DQS signal for approximately one clock cycle (i.e., the clock signal from the memory bus 41), beginning at a predefined time after the north bridge 34 issues the memory read command. For purposes of preventing the data capture circuitry from responding to the strobe signal prematurely, the strobe enable circuit 62 delays the assertion of the DLL_EN signal until time $T_1$ when a predetermined delay 79 has elapsed from a reference time, such as time $T_S$. The time $T_S$ may be, for example, a time at which the timing chain indicates an upcoming read operation. Due to the delay 75 that is introduced by the delay line 60, the delay line 60 does not drive the internal strobe line 65 with the DQS_OUT signal until time $T_2$, a time that begins in the preamble of the DQS_OUT signal.

Figure 14:
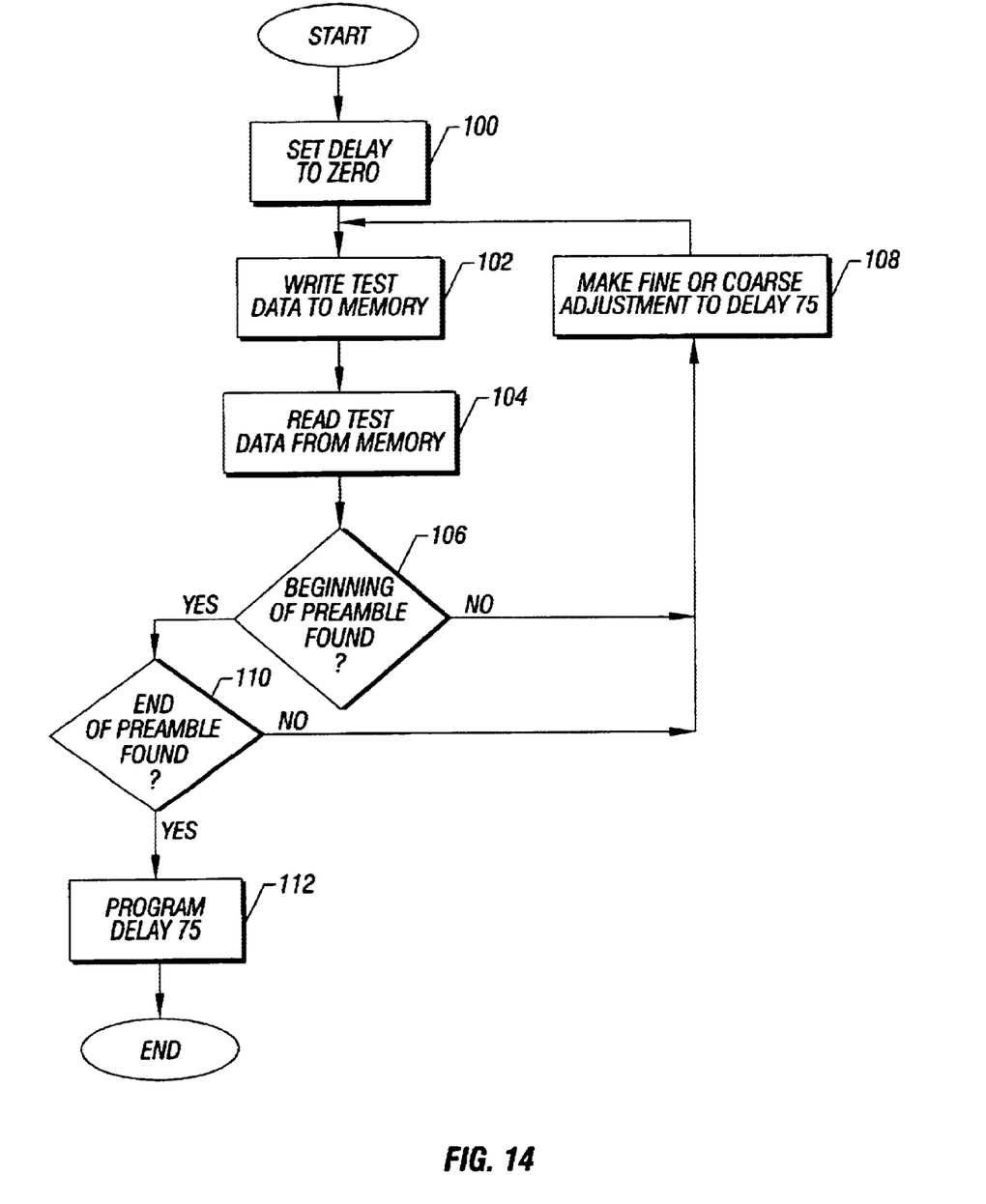
FIG. 14 is a flow diagram illustrating an algorithm executed by a processor of the computer system of FIG. 7 according to an embodiment of the invention.

The delay 79 may be programmed by the processor 32 (via lines 63 that are coupled to a configuration register) when executing basic input/output system (BIOS) code after initial bootup of the computer system 30. Referring also to FIG. 14, in this manner, the processor 32 may initially program the strobe enable circuit 62 (via a register of the north bridge 34) with a value to set the delay 79 to approximately zero, and thereafter, the processor 32 may initiate a series of write and read operations to determine if the beginning of the preamble has been located. For example, the processor 32 may (via the north bridge 34) write (block 102) a pattern of test data to predefined locations of the system memory 44. The processor 32 then may read (block 104) the contents of the predefined locations and compare the read data with the original pattern to determine if a read error occurred. If so, the processor 32 makes (block 108) coarse adjustments to increase the delay and repeats blocks 102 and 104 until no read errors occur. The processor 32 then makes fine adjustments to decrease the delay and repeats blocks 102 and 104 until a read error occurs, an event that identifies the beginning of the preamble. At this point, the processor 32 determines (diamond 106) that the beginning of the preamble has been located and then performs read and write operations similar to those described above to find the end of the preamble. In this manner, after the processor 32 determines (diamond 110) that the end of the preamble has been located, the processor 32 programs (block 112) the strobe enable circuit 62 with the appropriate value. The duration of the delay 79 may vary over time due to, for example, temperature and voltage fluctuations. However, because the preamble typically occurs a sufficiently long interval of time (over a time interval approximately equal to one cycle of clock signal of the memory bus 41, for example), the duration of the preamble tolerates changes in the duration of the delay 79.

Unfortunately, the postamble occurs over a much smaller interval of time (over a time interval that may be approximately one half of the time interval over which the preamble occurs, for example), and as a result, predicting the postamble by measuring a delay from a fixed time may be unreliable. As a result, in some embodiments, the strobe enable circuit 62 monitors the DQS signal to detect a voltage-time profile, or signature, that indicates the beginning of the postamble. Once the strobe enable circuit 62 detects this signature, the circuit 62 deasserts (drives low, for example) the DLL_EN signal to shut down the generation of the DQS_O signal.

More particularly, in some embodiments, the strobe enable circuit 42 monitors the DQS signal to detect the following sequence that occurs before the beginning of the preamble: a positive edge followed by a negative edge. As depicted in FIG. 8, the DQS signal has two of these sequences. However, the strobe enable circuit 42 skips the first sequence by a measuring a delay 77 from time $T_0$ to time $T_5$, and when the delay 77 elapses, the strobe enable circuit 42 begins monitoring the DQS signal to detect the latter sequence. Because the delay 77 may expire any time during the occurrence of the first sequence, the delay 77 may vary over a significantly wider range than, for example, a delay that is used to predict the postamble.

Figure 15:
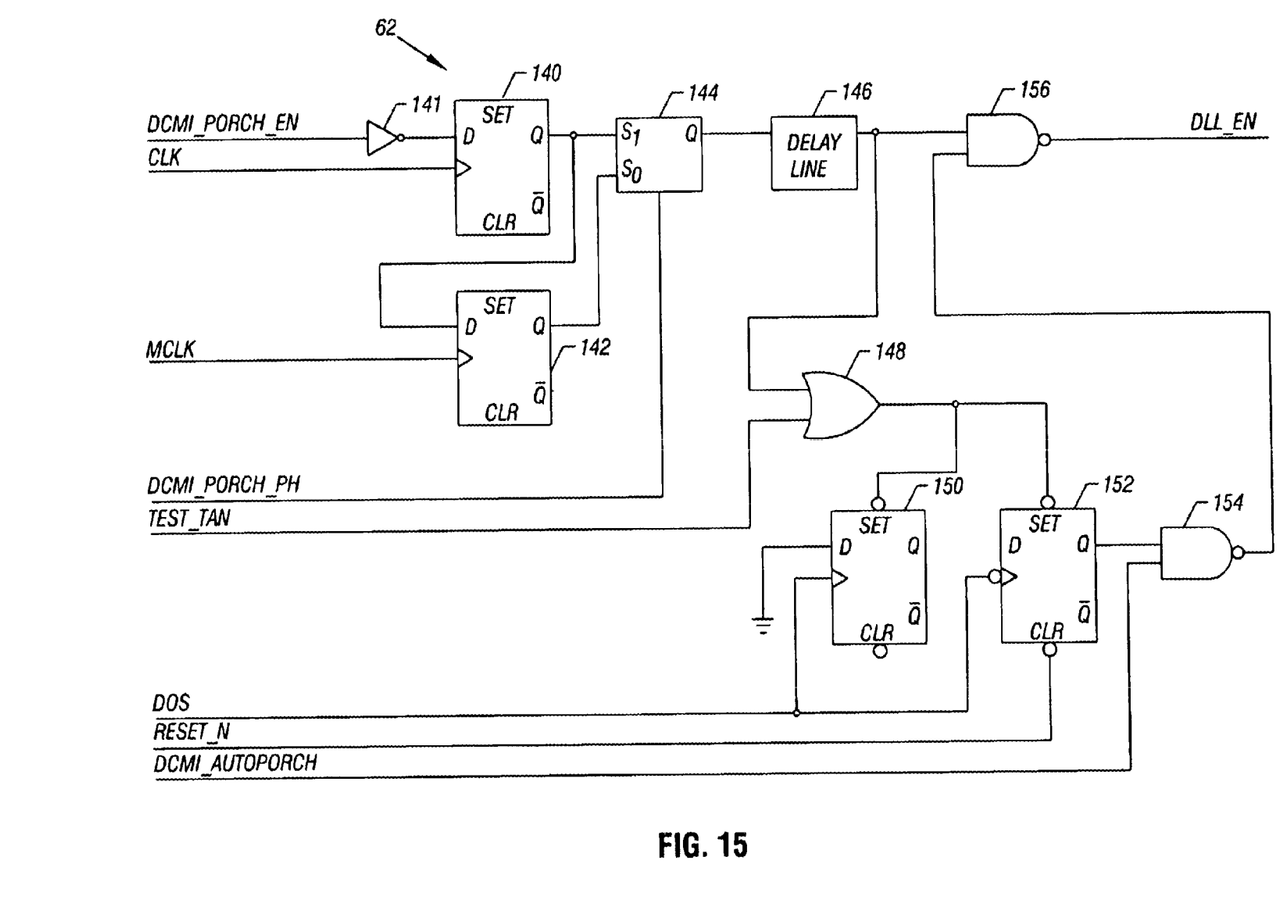
FIG. 15 is a more detailed schematic diagram of the circuit of FIG. 13 according to an embodiment of the invention.

FIG. 15 depicts an embodiment of the strobe enable circuit 62. For purposes of this discussion, it is assumed that a test signal called TEST_TAI has a logic zero level, a reset signal called RESET_N has a logic one level and a signal called DCMI_AUTOPORCH, a signal that generally enables the sequence detection features of the circuit 62, has a logic one level.

Figure 9:
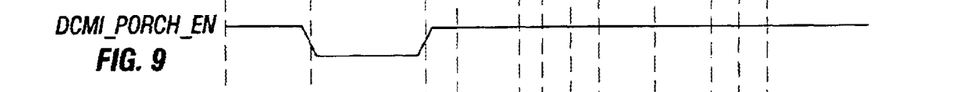

As shown, the strobe enable circuit 62 receives a signal (called DCMI_PORCH_EN) that when indicates the beginning of the delay 77 when asserted (driven to a logic one level for example). Thus, the DCMI_PORCH_EN signal is asserted on a predetermined clock cycle in a read operation, such as time $T_0$, for example, as depicted in FIG. 9. The DCMI_PORCH_EN signal is inverted by an inverter 141 that has its output terminal coupled to the input terminal of a D-type flip-flop 140. The flip-flop 140 is clocked on the positive edge of a CLK signal, and the output terminal of the flip-flop 140 is coupled to an input terminal of a multiplexer 144. The CLK signal has the same frequency of and generally follows the CK clock signal of the memory bus 41. The other input terminal of the multiplexer 144 is coupled to the output terminal of a D-type flip-flop 142 that is clocked on the positive edge of a clock signal (called MCLK) that may be, for example, twice the frequency of the CLK signal. The input terminal of the flip-flop 142 is coupled to the output terminal of the flip-flop 140.

Due to the above-described arrangement, the beginning of the delay 77 may be moved forward in time by selecting (via a select signal called DCMI_PORCH_PH) either the signal at the output terminal of the flip-flop 140 or the signal at the output terminal of the flip-flop 142. The output terminal of the multiplexer 144, in turn, is coupled to the input terminal of a delay line 146 that measures the duration of the delays 77 and 79. The output terminal of the delay line 146 may furnish a delayed and inverted indication of the signal that is received at the input terminal of the delay line 146. In some embodiments, the delay line 146 may be programmed to establish its delay.

The DCMI_PORCH_EN signal (see FIG. 9) is momentarily driven to a logic zero level preceding a read operation to cause a delayed assertion of the DLL_EN signal. In this manner, at time $T_s$, the DCMI_PORCH_EN signal may driven from a logic one to a logic zero level, an event that drives the signal produced by the output terminal of the delay line 146 to a logic zero level after the expiration of the delay 79 and causes the assertion of the DLL_EN signal. The DCMI_PORCH_EN signal is driven high at a predetermined time, such as time $T_0$ to begin measurement of the delay 77.

Because the DCMI_PORCH_EN signal is driven to a logic zero level before time $T_0$, the output signal of the delay line 146 initially has a logic one level, a state that disables two D-type flip-flops 150 and 152 from detecting the positive edge-negative edge sequence, as described below. In this manner, the logic one level propagates through an OR gate 148 that has its output terminal coupled to set terminals of the flip-flops 150 and 152. In the set state, the flip-flops 150 and 152 do not respond to the DQS signal that clocks the flip-flops 150. However, when the DCMI_PORCH_EN signal is driven high, the output signal of the delay line 146 is driven to a logic one level after the delay 77 elapses. Upon this occurrence, the flip-flop 150 is clocked on the positive edge of the DQS signal, and the flip-flop 152 is clocked on the negative edge of the DQS signal.

The input terminal of the flip-flop 150 is coupled to a logic zero level, and the output terminal of the flip-flop 150 is coupled to the input terminal of the flip-flop 152. Due to this arrangement, before the delay 77 elapses, the output signal of the flip-flop 152 is at logic one level, a state that causes a NAND gate 154 to drive its output signal to a logic zero level. The output terminal of the NAND gate 154 is coupled to an input terminal of a NAND gate 156 that furnishes the DLL_EN signal. The other input terminal of the NAND gate 146 is coupled to the output terminal of the delay line 146. Thus, before the delay 77 elapses, the assertion of the DLL_EN signal is attributable to either the logic zero level signal that is furnished by the delay line 146 or the logic zero level signal that is furnished by the NAND gate 154.

After the delay 77 elapses, the delay line 146 drives its output signal to a logic one level, and thus, the state of the DLL_EN signal depends on the output signal from the NAND gate 154. In other words, before the flip-flops 150 and 152 detect the positive edge-negative edge sequence, the output signal of the NAND gate 154 has a logic zero level, a level that keeps the DLL_EN signal at a logic one level. However, after the flip-flops 150 and 152 detect the sequence (as described below), the NAND gate 154 drives its output signal to a logic one level, a level that cause the NAND gate 156 to drive the DLL_EN signal to a logic zero level.

The flip-flops 150 and 152 detect the positive edge-negative edge sequence in the following manner. On the positive edge of the sequence, the flip-flop 150 captures its input signal (a logic zero level) to furnish a logic zero signal to the flip-flop 152. On the negative edge of the sequence, the flip-flop 152 captures the logic zero input signal (that is furnished by the flip-flop 150) to furnish a logic zero level signal at its output terminal to cause NAND gate 154 to drive its output signal low. It is noted that the flip-flops 150 and 152 still detect the positive edge-negative edge sequence even if the flip-flops 150 are taken out of the set states to observe the last three edges, i.e., a negative edge-positive edge-negative edge sequence.

Figure 16:
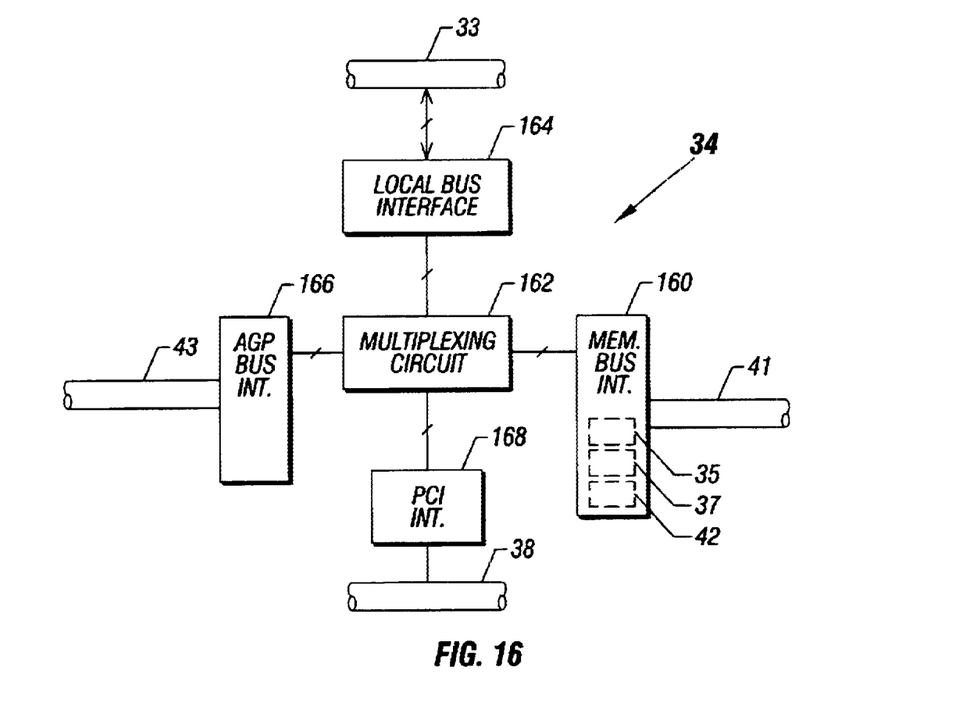
FIG. 16 is a schematic diagram of the bridge of the computer system of FIG. 7 according to an embodiment of the invention.

Referring to FIG. 16, in some embodiments, the read counters 35, read buffers 37 and data strobe response circuit 42 may be part of a memory interface 160 of the north bridge 34. The bridge 34 may include interfaces to other busses such as a local bus interface 164, an Accelerated Graphics Port (AGP) bus interface and a Peripheral Component Interconnect (PCI) bus interface 168. The AGP is described in detail in the Accelerated Graphics Port Interface Specification, Revision 1.0, published on Jul. 31, 1996, by Intel Corporation of Santa Clara, Calif. The PCI Specification is available from the PCI Special Interest Group, Portland, Oreg. 97214. The bridge 34 may include multiplexing circuitry 162 to selectively coupled the interfaces 160, 164, 166 and 168 together.

Referring back to FIG. 7, beside the components described above, the computer system 30 may also include a display controller 45 that is coupled to the AGP bus 43 and controls a display 47. A modem 46, for example, may be coupled to the PCI bus 38 along with a south bridge 36. The south bridge 36 may provide an interface to an I/O expansion bus 40, a hard disk drive 48 and a CD-ROM 50. An I/O controller 54 may be coupled to the I/O expansion bus 40 and receive input from a mouse 56 and a keyboard 58. The I/O controller 54 may further control the operation of a floppy disk drive 52. A read only memory (ROM) 39 may be coupled to the I/O expansion bus 40 and store a copy 37 of the BIOS code.

In the context of this application, the term "processor" may generally refer to one or more microprocessors, central processing units (CPUs), or microcontrollers, as just a few examples. The illustrated computer system 30 is an example of one of many different computer systems that may embody the invention. In the context of this application, the phrase "computer system" may generally refer to a desktop computer, a laptop computer or a handheld computer, as just a few examples.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A method for use with a computer system, comprising:
   receiving a data strobe signal from a memory bus, the data strobe signal being furnished by a memory device and including a postamble;
   monitoring the data strobe signal to detect a signature of the data strobe signal that precedes the beginning of the postamble; and
   preventing data capture circuitry from responding to the data strobe signal in response to detection of the signature.

2. The method of claim 1, wherein the signature comprises at least one edge of the data strobe signal, said at least one edge being used by the data capture circuitry to trigger the capture of data from the bus.

3. The method of claim 1, wherein the act of preventing comprises:
   isolating the data capture circuitry from the data strobe signal in response to the detection of the signature.

4. The method of claim 1, wherein the signature comprises at least two edges of the data strobe signal, said at least two edges being used by the data capture circuitry to trigger the capture of data from the bus.

5. The method of claim 1, wherein the signature comprises a positive going edge and a negative going edge of the data strobe signal.

6. The method of claim 1, wherein the data strobe signal comprises a double data rate data strobe signal.

7. A method for use with a computer system, comprising:
   receiving a data strobe signal from a memory bus, the data strobe signal being furnished by a memory device;
   measuring a delay;
   permitting data capture circuitry to respond to the data strobe signal before expiration of the delay; and
   preventing data capture circuitry from responding to the data strobe signal in response to the expiration of the delay.

8. The method of claim 7, wherein the data strobe signal includes a postamble and the expiration of the delay occurs before the preamble.

9. The method of claim 7, wherein the act of preventing comprises:
   isolating the data capture circuitry from the data strobe signal after the delay elapses.

10. The method of claim 7, wherein the data strobe signal includes a postamble, the method further comprising:
    after the expiration of the delay, monitoring the data strobe signal to detect the beginning of the postamble, and
    wherein the act of preventing comprises preventing the data capture circuitry from responding to the data strobe signal after the detection of the beginning of the postamble.

11. The method of claim 10, wherein the act of monitoring the data strobe signal comprises:
    detecting a predetermined signature of the data strobe signal.

12. A method for use with a computer system, comprising:
    receiving a data strobe signal from a memory bus, the data strobe signal being furnished by a memory device;
    measuring a delay; and
    preventing data capture circuitry from responding to the data strobe signal until the delay expires.

13. The method of claim 12, wherein the data strobe signal includes a preamble and the expiration of the delay occurs during the preamble.

14. The method of claim 12, wherein the act of preventing comprises:
    isolating the data capture circuitry from the data strobe signal until the delay expires.

15. The method of claim 12, further comprising:
    writing first data to predefined locations in a system memory;
    reading second data from the predefined locations;
    comparing the first data to the second data; and
    adjusting the delay to based on the comparison.

16. A bridge for use with a computer system, comprising:
    a first circuit adapted to capture data from a memory bus in response to a data strobe signal; and
    a second circuit coupled to the first circuit and adapted to:
        receive a data strobe signal from a memory bus, the data strobe signal being furnished by a memory device and including a postamble,
        monitor the data strobe signal to detect a signature of the data strobe signal that precedes the beginning of the postamble, and
        prevent the first circuit from responding to the data strobe signal in response to detection of the signature.

17. The bridge of claim 16, wherein the signature comprises at least one edge of the data strobe signal, said at least one edge being used by the first circuit to trigger the capture of data from the bus.

18. The bridge of claim 16, wherein the second circuit is adapted to isolate the first circuit from the data strobe signal in response to the detection of the signature.

19. The bridge of claim 16, wherein the signature comprises at least two edges of the data strobe signal, said at least two edges being used by the first circuit to trigger the capture of data from the bus.

20. The bridge of claim 16, wherein the signature comprises a positive going edge and a negative going edge of the data strobe signal.

21. The bridge of claim 16, wherein the data strobe signal comprises a double data rate data strobe signal.

22. A bridge for use with a computer system, comprising:
   a first circuit adapted to capture data from a memory bus in response to a data strobe signal; and
   a second circuit coupled to the first circuit and adapted to:
      measuring a delay,
      permit the first circuit to respond to the data strobe signal before expiration of the delay; and
      prevent the first circuit from responding to the data strobe signal in response to the expiration of the delay.

23. The bridge of claim 22, wherein the data strobe signal includes a postamble and the expiration of the delay occurs before the preamble.

24. The bridge of claim 22, wherein the second circuit is further adapted to:
   isolate the data capture circuitry from the data strobe signal after the delay elapses.

25. The bridge of claim 22, wherein the data strobe signal includes a postamble, the second circuit further adapted to:
   after the expiration of the delay, monitor the data strobe signal to detect the beginning of the postamble, and
   prevent the first circuit from responding to the data strobe signal after the detection of the beginning of the postamble.

26. A bridge for use with a computer system, comprising:
   a first circuit adapted to receive a data strobe signal from a memory bus and capture data from the bus in response to the data strobe signal; and
   a second circuit adapted to:
      measure a delay; and
      prevent the first circuit from responding to the data strobe signal until after the delay expires.

27. The bridge of claim 26, wherein the data strobe signal includes a preamble and the expiration of the delay occurs during the preamble.

28. The bridge of claim 27, wherein the second circuit is further adapted to:
   isolate the first circuit from the data strobe signal until the delay expires.

29. A computer system comprising:
   a memory bus;
   a memory device adapted to furnish a data strobe signal to the memory bus and furnish other signals to the memory bus indicative of data; and
   a bridge comprising:
      a first circuit adapted to use said other signals to capture the data in response to the data strobe signal; and
      a second circuit coupled to the first circuit and adapted to:
         receive a data strobe signal from a memory bus, the data strobe signal being furnished by a memory device and including a postamble,
         monitor the data strobe signal to detect a signature of the data strobe signal that precedes the beginning of the postamble, and
      prevent the first circuit from responding to the data strobe signal in response to the detection of the signature.

30. The computer system of claim 29, wherein the signature comprises at least one edge of the data strobe signal, said at least one edge being used by the first circuit to trigger the capture of data from the bus.

31. The computer system of claim 29, wherein the second circuit is adapted to isolate the first circuit from the data strobe signal in response to the detection of the signature.

32. The computer system of claim 29, wherein the signature comprises at least two edges of the data strobe signal, said at least two edges being used by the first circuit to trigger the capture of data from the bus.

33. The computer system of claim 29, wherein the signature comprises a positive going edge and a negative going edge of the data strobe signal.

34. The bridge of claim 29, wherein the data strobe signal comprises a double data rate data strobe signal.

* * * * *